United States Patent
Dandabany

(10) Patent No.: US 9,112,879 B2
(45) Date of Patent: Aug. 18, 2015

(54) LOCATION DETERMINED NETWORK ACCESS

(75) Inventor: Sankarlingam Dandabany, Rancho Cordova, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 805 days.

(21) Appl. No.: 12/464,303

(22) Filed: May 12, 2009

(65) Prior Publication Data

US 2010/0293590 A1 Nov. 18, 2010

(51) Int. Cl.
*G06F 15/16* (2006.01)
*H04L 29/06* (2006.01)

(52) U.S. Cl.
CPC ............ *H04L 63/105* (2013.01); *H04L 63/107* (2013.01); *H04L 63/108* (2013.01); *H04L 63/10* (2013.01)

(58) Field of Classification Search
CPC ..... H04L 63/10; H04L 63/105; H04L 63/107; H04L 63/108
See application file for complete search history.

(56) References Cited

U.S. PATENT DOCUMENTS

| | | | | |
|---|---|---|---|---|
| 5,291,596 A * | 3/1994 | Mita | ..................................... | 1/1 |
| 5,555,376 A * | 9/1996 | Theimer et al. | ................ | 709/229 |
| 5,938,721 A * | 8/1999 | Dussell et al. | ................. | 701/468 |
| 6,438,594 B1 * | 8/2002 | Bowman-Amuah | .......... | 709/225 |
| 6,484,033 B2 * | 11/2002 | Murray | ....................... | 455/456.3 |
| 6,571,221 B1 * | 5/2003 | Stewart et al. | ................... | 705/52 |
| 7,024,552 B1 * | 4/2006 | Caswell et al. | ................ | 713/155 |
| 7,437,755 B2 * | 10/2008 | Farino et al. | ....................... | 726/5 |
| 7,738,411 B2 * | 6/2010 | Koponen et al. | ............... | 370/315 |
| 8,423,768 B2 * | 4/2013 | Huang et al. | .................... | 713/168 |
| 2001/0011352 A1 * | 8/2001 | O'Mahony | ..................... | 713/200 |
| 2002/0124067 A1 * | 9/2002 | Parupudi et al. | .............. | 709/223 |
| 2002/0137524 A1 * | 9/2002 | Bade et al. | ...................... | 455/456 |
| 2002/0164997 A1 * | 11/2002 | Parry | ............................. | 455/456 |
| 2003/0217264 A1 * | 11/2003 | Martin et al. | .................. | 713/156 |
| 2004/0009778 A1 * | 1/2004 | Makuta | ....................... | 455/456.1 |
| 2005/0113113 A1 * | 5/2005 | Reed | ........................... | 455/456.3 |
| 2005/0273493 A1 * | 12/2005 | Buford et al. | .................. | 709/204 |
| 2006/0059096 A1 * | 3/2006 | Dublish et al. | ................... | 705/57 |
| 2006/0143292 A1 * | 6/2006 | Taubenheim et al. | ......... | 709/225 |

(Continued)

FOREIGN PATENT DOCUMENTS

| | | |
|---|---|---|
| JP | 2003224884 A | 8/2003 |
| WO | WO 2008144520 A2 * | 11/2008 |
| WO | WO-2008144520 A2 | 12/2008 |

OTHER PUBLICATIONS

International Search Report Mail Date May 14, 2010. Application No. PCT/US2009/050284. Filing date Jul. 10, 2009.

(Continued)

*Primary Examiner* — Krista Zele
*Assistant Examiner* — Anthony Fabbri
(74) *Attorney, Agent, or Firm* — Venable LLP

(57) ABSTRACT

A system and method for network authentication is provided. A network access device is operable to establish a communications with an internal network. A client device is operable to request and establish the communications over the internal network by interfacing with the network access device. A processor is operable to interface with the network access device to establish the communications between the client device and the internal network. The processor is also operable to establish a communications level for the communications based on the location of the client device.

18 Claims, 3 Drawing Sheets

(56) References Cited

U.S. PATENT DOCUMENTS

| | | | |
|---|---|---|---|
| 2006/0252408 A1* | 11/2006 | Faccin et al. | 455/404.2 |
| 2006/0281471 A1* | 12/2006 | Shaffer et al. | 455/456.2 |
| 2007/0015516 A1* | 1/2007 | Huotari et al. | 455/456.1 |
| 2007/0157019 A1* | 7/2007 | York | 713/155 |
| 2007/0287419 A1* | 12/2007 | Wang | 455/411 |
| 2008/0027943 A1* | 1/2008 | Clemens | 707/10 |
| 2008/0065908 A1* | 3/2008 | Appaji | 713/193 |
| 2009/0319616 A1* | 12/2009 | Lewis et al. | 709/206 |

OTHER PUBLICATIONS

International Preliminary Report on Patentability, PCT/US2009/050284, Nov. 24, 2011.

* cited by examiner

LOCATION DETERMINED NETWORK ACCESS

FIELD OF THE INVENTION

The present invention relates generally to client to server communications, and more particularly to network access determination.

BACKGROUND

Before a client device is permitted communications with a network, security protocols may implemented at the network. Network authentication modules, devices or servers may be implemented to perform security checks. The client device is not allowed access through the network authentication devices until the identity of the client device is authenticated and validated. These checks are designed to protect the integrity and security of the network from un-permitted, non-malicious free network usage as well as malicious usage leading to compromise of security, destruction of vital data, and other activities counter to productive network usage.

Networks may require appropriate connection information, such as a network name and mode of operation to establish network connection. They may require appropriate authentication and encryption parameters to establish send and receive communications. In some environments, manual configuration of parameters and settings are required. These protocols may provide complications and difficulties in establishing a connection for users.

The fact that such systems may place the capability to establish connections within the purview of users may also provide problems. The willingness and ability of users to maintain the integrity of vital security data uncompromised and secure may be an open, unresolved issue for network management. The network administrators may desire network security to be administered in an automatic, robust, failsafe manner independent of, or in addition to, the existing security protocols and parameters. In addition, network administrators may desire security systems to prevent, for example, network access by users when users are not within the confines of given parameters. The geographical or physical location of a company's offices may qualify as exemplary desirable parameters.

BRIEF DESCRIPTION OF THE DRAWINGS

Embodiments according to the invention are illustrated by the following drawings.

DETAILED DESCRIPTION

Figure 1A:
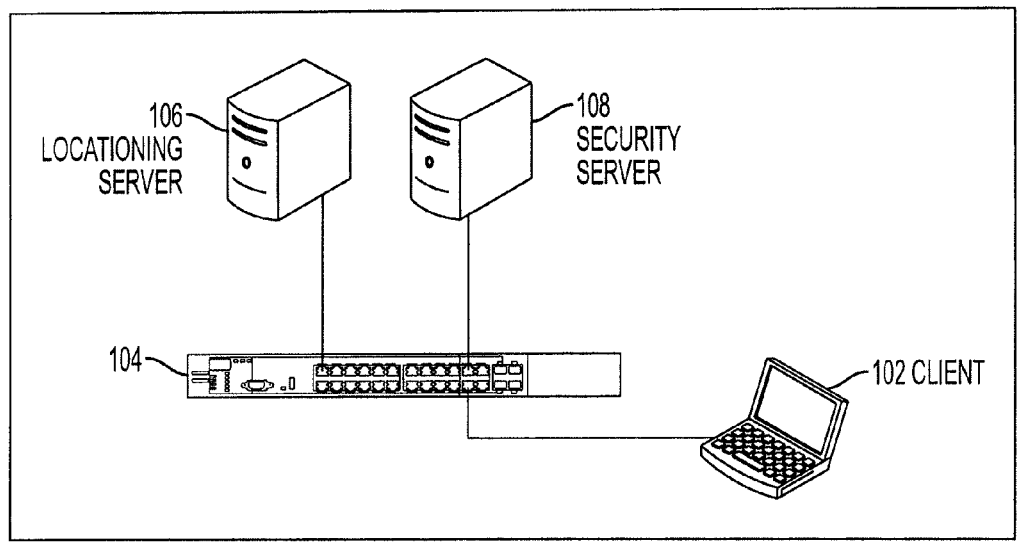
FIG. 1A is a block diagram illustrating an exemplary system for providing network access in a wireline environment.

FIG. 1A illustrates an exemplary system 100 for providing network access in a wireline environment. The exemplary system 100 includes client device 102, network access device 104, locationing server 106, and security server 108.

Each or any combination of client device 102, network access device 104, locationing server 106 and security server 108 may wholly or partially, in either components or by function, comprise hardware, software, firmware, or a combination thereof and may be implemented in one or more computer systems or other processing systems. By way of example only, the computer systems may include a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers. The computer systems may include one or more processors, which may be connected to a communication infrastructure, comprising LANs, WANs, ISPs and communications buses and other network elements.

The computer systems may include any storage elements. By way of example, the storage elements may include main memory, random access memory (RAM), and secondary memory, which may include, for example, a hard disk drive, a removable storage drive, a floppy diskette drive, a magnetic tape drive, an optical disk drive and a compact disk drive CD-ROM. The computer systems may also include any input devices. Exemplary input devices may include a mouse or other pointing device, such as a digitizer, and a keyboard or other data entry device. The computer systems may also include any output devices. Exemplary output devices may include a display and display interface. The computer systems may also include any input/output (I/O) communications devices and interfaces. Exemplary I/O communications devices may include communications ports, network interface cards and modems. Exemplary communications interfaces may allow software and data to be transferred between the computer systems and external devices.

Network access device 104 may include any device providing the capability of accessing a network of exemplary system 100. An exemplary network access device 104 may include a router, a device that may forward data packets along networks. The exemplary router may be connected to two or more networks, which may be, for example, any combination of local area networks (LANs), wide area networks (WANs) and Internet service provider (ISP) networks. The router may be located at gateways, where two or more such networks connect.

An exemplary network access device 104 is a switch or a hub. The exemplary switch may include a combination of hardware or software that joins multiple client devices 102 together within or across a LAN, a WAN, the Internet, or some combination of the latter. The exemplary switch is capable of inspecting data packets as they are received, determining the source and destination device of the packets, and forwarding them appropriately.

Client device 102 may include any device requesting to establish communications with the-network of system 100 over a wired, or wireline, connection. Exemplary client devices 102 include personal computers, laptops and notebook computers, though any of the aforementioned computer systems may qualify as client devices.

Locationing server 106 may include any device determining whether client device 102 is granted access to the network based on parameters or protocols additional to the parameters or protocols employed by security server 108, including without limitation parameters or protocols based on the location of the client device 102. An exemplary locationing server 106 comprises processors executing locationing software in a server, though any of the aforementioned computer systems may qualify as locationing servers. The locationing server 106 may also function along with, based on, or in coordination with a policy server, whose function is to determine whether to provide network access, and to what extent to provide such network access. For example, network access may be denied, or provided to the full network, or to a partial component of the network, or to partial operational functionality within the network. In an exemplary embodiment, any of the features and functions of the aforementioned locationing server 106 may be performed by a policy server. In an exemplary embodiment, any of the features and functions of the aforementioned policy server may be performed by locationing server 106.

Security server 108 may include any device determining whether client device 102 is granted access to the network based on network security protocols and parameters. An exemplary security server 108 comprises processors executing security software in a server, though any of the aforementioned computer systems may qualify as security servers. The security server 108 may also function along with, based on, or in coordination with the policy server.

Figure 1B:
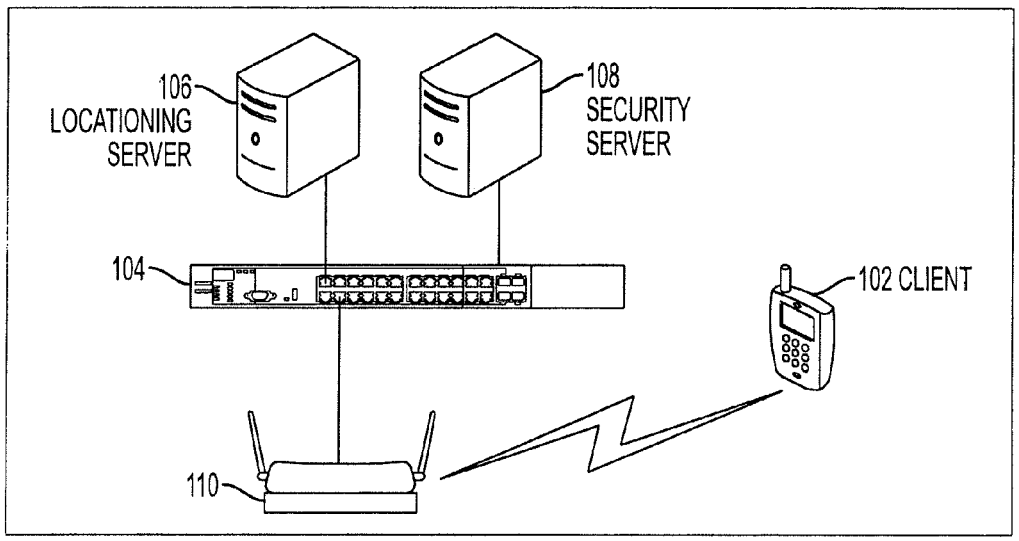
FIG. 1B is a block diagram illustrating an exemplary system for providing network access in a wireless environment.

FIG. 1B illustrates exemplary system 100 for providing network access to a wireless device. Exemplary system 100 of FIG. 1B includes client device 102, network access device 104, locationing server 106, and security server 108. The features and functions of these devices are as above noted in reference to FIG. 1A. In an exemplary embodiment, client device 102 may be a wireless device. Exemplary wireless devices may include mobile phones and wireless PDAs, personal computers and handheld PCs.

Exemplary system 100 of FIG. 1B also includes wireless device 110. Wireless device may include any device providing a wireless device access to the network. An exemplary wireless device 110 is a device denoted as a wireless access point, an access point, or a Wi-Fi access point, which may be the hub of the wireless network connecting the wireless client device 102 to network access device 104. Exemplary wireless access points may include wireless routers, wireless gateways, and base stations. The combination of the wireless device 110 and the network access device 104 may also share LAN, WAN or Internet connections, or provide a bridge between wired and wireless networks.

Figure 2:
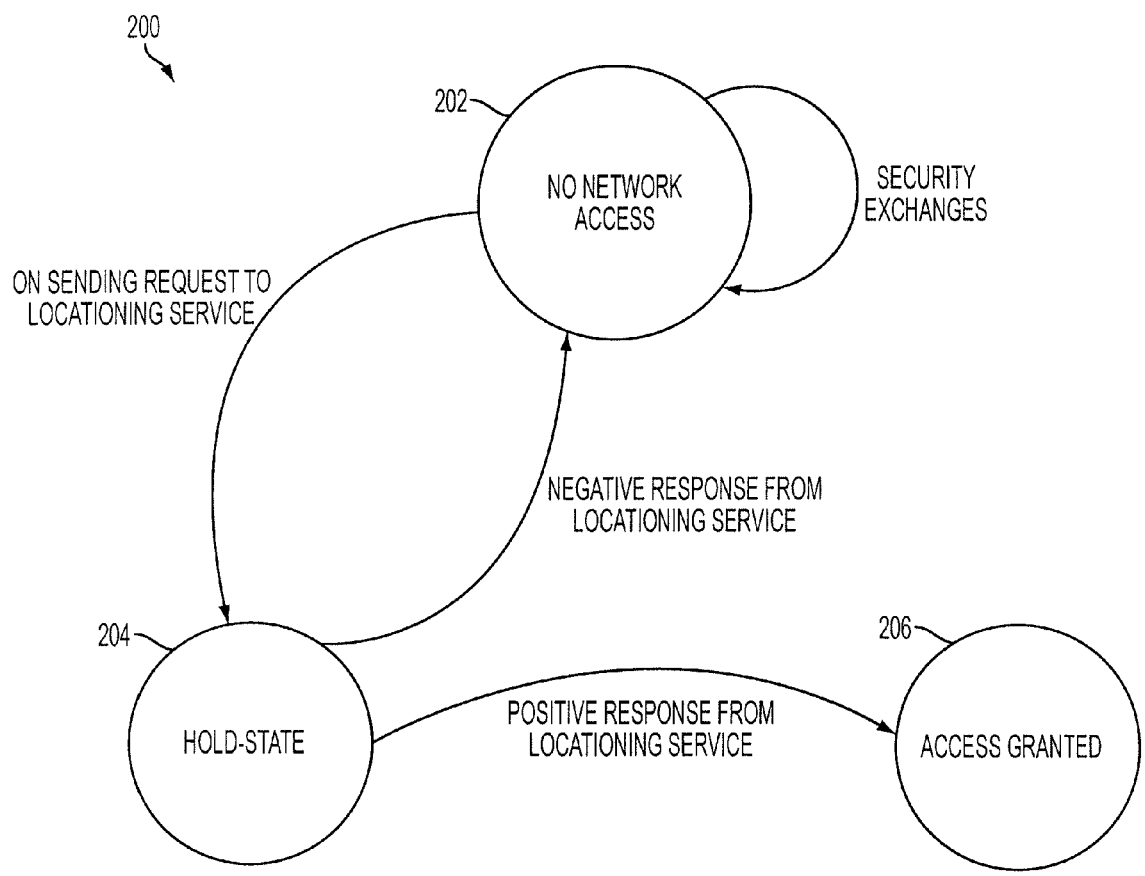
FIG. 2 is an exemplary illustration of a state machine used in exemplary wireline and wireless environments.
Figure 3:
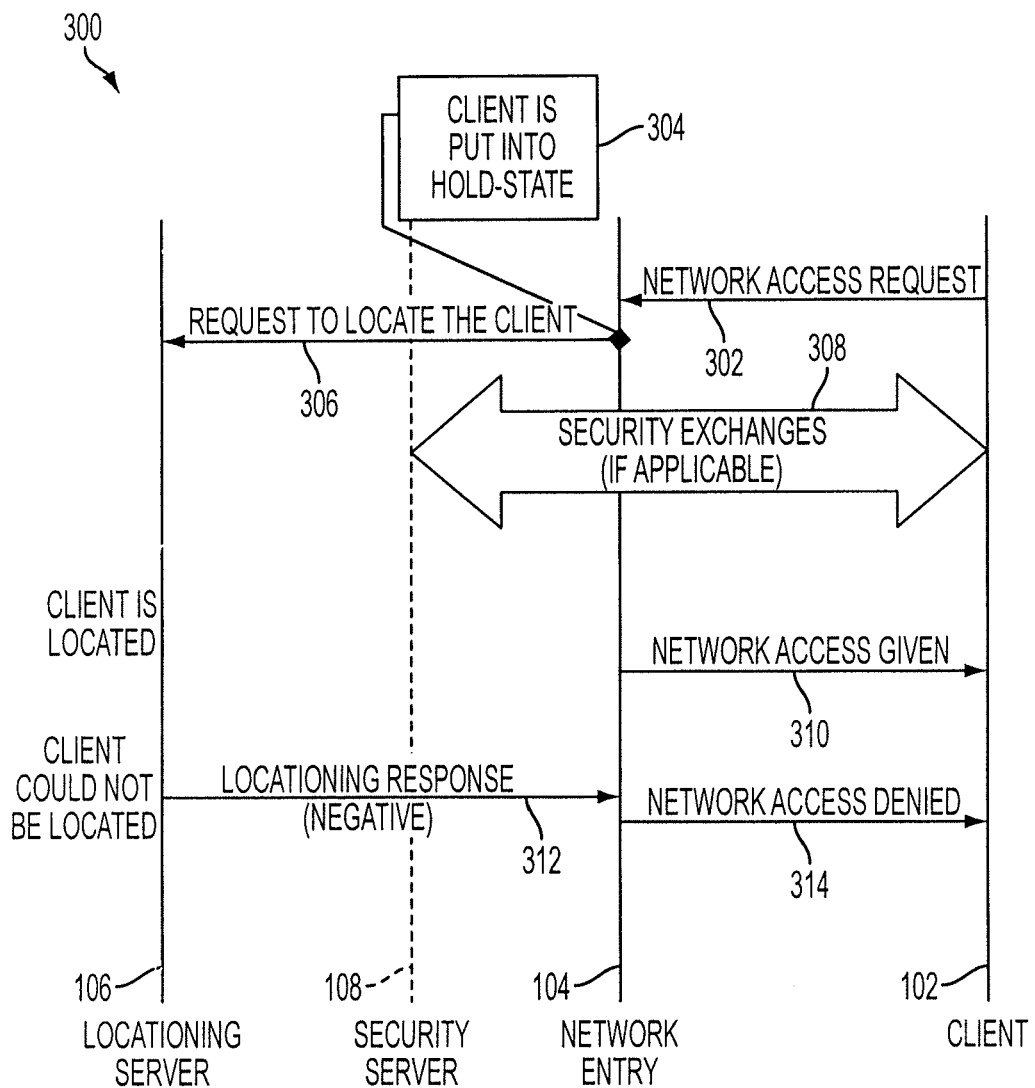
FIG. 3 is an exemplary illustration of a telecommunications flow path used in accordance with exemplary wireline and wireless environments.

FIG. 2 illustrates an exemplary state machine for the exemplary wireline and wireless environments of system 100. FIG. 3 illustrates an exemplary telecommunications flow path used in accordance with the exemplary wireline and wireless environments of system 100. Together, the figures may be used to demonstrate the functions and features of the present embodiments.

Initially, the system may be in the no network access state 202. Here, client device 102 may have no access to system 100.

Client device 102, with no network connection, may attempt to connect to the network of system 100. Client device 102 may transmit a network access request 302 to the network entry point, namely network access point 104.

The network access point 104 may then transmit a request 306 to the locationing server 106 to locate a characteristic of the client device 102. In an exemplary embodiment, the characteristic is the geographical or physical location of the client device 102, and request 306 is a request to locate the client device 102.

Upon, during or after receiving the network access request 104 and transmitting the request to locate the client device 102, the system may enter hold-state 204.

In an exemplary embodiment, the port of network access device 104, on which the new client device 102 may connect, may have a setting with respect to security. The setting may be used to determine whether either or both locationing server 106 and security server 108 are to be accessed. In an embodiment, the connection may be a wireline connection. In an embodiment, the connection may be a wireless connection.

In an exemplary embodiment, the port requires no authentication and security server 108 need not be accessed as a connection may be automatically granted.

In an exemplary embodiment, the port requires authentication, and locationing server 106 and/or security server 108 determine whether to grant new client device 102 a connection to the network.

If security authentication is required, security codes, parameters and/or protocols may be exchanged in 308 between client device 102, network access device 104, and/or security server 108. Any type of security authentication may be performed. Exemplary security authentication methods may include IEEE 802.1X authentication, Message Authentication Code (MAC) authentication and Wired Equivalent Privacy (WEP) authentication.

As an example, the port may use or require IEEE 802.1X authentication. The standard may be used for wireless 802.11 access points and is based on the Extensible Authentication Protocol (EAP). The standard may require authentication involving communications between the client device 102, an authenticator and an authenticating server. The functions of the authenticator and authenticating server may be performed by network access device 104, security server 108, external devices, or any combination of these devices. For example, the authenticator may be a wired Ethernet switch or wireless access point, the authentication server may be a Remote Authentication Dial In User Service (RADIUS) database. The client device 102 may provide credentials, such as user name, password or digital certificate, to the authenticating security server 108, which uses the authenticator to verify the credentials. The client device 102 may not be allowed access through the authenticator to system 100 until its identity is authorized. If the credentials are valid, client device 102 may be permitted access to system 100.

As an example, the port may use or require message authentication code (MAC) authentication, where a cryptographic MAC code is used to authenticate the message. The authentication function may be performed by network access device 104, security server 108, external devices, or any combination of these devices. Here, a MAC algorithm executed by security server 108 may accept as input a secret key and an arbitrary-length message to be authenticated, and outputs a MAC. The MAC value may protect the data integrity and authenticity of the message by permitting security server 108, which possesses a secret key, to detect any changes to the message content. The client device 102 may not be allowed access to system 100 until its identity is authorized. If the credentials are valid, client device 102 may be permitted access to system 100.

As an example, the port may require WEP authentication. WEP authentication may include Open System or Shared Key authentication. The authentication function may be performed by network access device 104, security server 108, external devices, or any combination of these devices. The WEP authentication algorithm may use the stream cipher Redundancy Check 4 (RC4) for data confidentiality, and the Cyclic Redundancy Check (CRC-32) checksum for data integrity. In Shared Key authentication, a four-way challenge-response handshake is used, where security server 108 may transmit a clear text challenge to client device 102 in response to the network access request. Client device 102 may encrypt the challenge text using a configured WEP key, and send it back in another authentication request. Security server 108 may decrypt the information, compare it with the clear-text it had sent, and depending on the success of this comparison, secured access may be granted. After the authentication and association, WEP can be used for encrypting the data frames. The client device 102 may not be allowed access to system 100 until authentication is performed and the identity of client device 102 is authorized.

As shown in FIG. 2, in an exemplary embodiment the state of the system is unchanged from the network access state 202 pending the outcome of the above noted security exchanges 308. The reason is that in the exemplary embodiment, a positive response from the locationing server 106 is also desired before network access is granted to client device 102.

Returning to FIG. 3, locationing server 106 and/or a proxy server determine whether the desired characteristic, such as the geographical or physical location of the client device 102 is acceptable. In an exemplary embodiment, if the client device 102 is located within an acceptable location, the positive response of the locationing server 106 may require network access device 104 to accept the connection and permit entry. In an exemplary embodiment, locationing server 106 determines the location of client device 102, and a proxy server (not shown) determines whether to grant client device 102 network access, and to what degree to grant the access. The proxy server may condition or otherwise signal network access device 104 to grant or deny the respective level of access. In an exemplary embodiment, the functions of the above proxy server The network access may be based on a communications level where network access may be denied entirely, granted with no conditions, or granted partially. Where partial access is granted, access may be granted for partial components or portions of the network, for partial functions to network resources, for partial periods of time. Network access may be determined based on the foregoing or any other parameters, determined in real time or from predetermined conditions.

The locationing server 106 may use any methods to determine the location of client device 102. In an exemplary embodiment, the location of client device 102 is determined based on the port of network access device 104 on which client device 102 is connected. In an exemplary embodiment, the location of client device 102 is based on the port of network access device 104 on which client device 102 is connected, and the length of the physical communications line connecting the client device 102 to the network access device 104. An exemplary communications line includes an Ethernet cable. In an exemplary embodiment, the client device 102 and/or the wireless device 110 may be located by employing triangulation. In an exemplary embodiment, the triangulation method uses signal strength data from access points surrounding the client device 102 and/or the wireless device 110 to determine one or more of their respective locations.

Network permission 310 may be transmitted to client device 102. As shown in FIG. 2, the system may leave hold state 204 and permit access in access granted state 206. In an exemplary embodiment, network access is granted and a state change to the access granted state 206 occurs if a favorable or positive response has been has been received from security exchanges 308.

In an exemplary embodiment, the client device 102 is not located within an acceptable location. Here, the negative response of the locationing server 106 may require network access device 104 to deny the connection and entry to system 100. The network denial 314 may be transmitted to client device 102. As shown in FIG. 2, the system may leave hold state 204 and return to the no network access state 202.

In an exemplary embodiment, a time-out function is performed by locationing server 106. Here, the client device 102 is not located within an acceptable location, but the locationing server 106 may permit additional time for the client device 102 to enter an acceptable location. The reason is that the client device 102 may be mobile, and the network operators may desire to permit additional time for the client device 102 to enter an acceptable location. Once the time-out period has lapsed, the client device 102 is deemed not located within an acceptable location. Here, locationing server 106 may transmit a negative response to the network access device 104 to deny the connection and entry to system 100. Again, network denial 314 may be transmitted to client device 102. As shown in FIG. 2, the system leaves hold state 204 and returns to the no network access state 202.

In addition, In an exemplary embodiment the system may be held in hold state 204 until one or more events occur or are completed during security authorization. For example, it may be useful to hold the system in the hold state 204, at least until a response from locationing server 106 and/or the proxy server indicate that the location is to be given one of the above noted levels of access. Exemplary events include (i) the association response to be sent for no security and static WEP security policies; (ii) the third message of a four way handshake that is to be sent for Wi-Fi Protected Access with Pre-Shared Key (WPA-PSK) and WPA security policies; (iii) the Extensible Authentication Protocol over LANs (EAPOL) success message to be sent for dynamic WEP security policy; and (iv) the WebAuth success message to be sent for the web authentication security policy.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A network authentication system, comprising:
a locationing server to interface with a network access device to establish communications between a client device and an internal network, to determine a location of the client device, to determine whether the client device is within an authorized physical location to communicate over the internal network, to determine a communications level to be granted to the client device based on the physical location of the client device and to grant the determined communications level to the client device in response to a determination that the client device is within the authorized physical location, to perform a time-out function in response to a determination that the client device is outside of the authorized physical location, to grant the determined communication level to the client device in response to the client device being within the authorized physical location prior to expiration of the time-out function, and to deny access to the internal network by the client device in response to a determination that the client device is outside of the authorized physical location following expiration of the time-out function; wherein the locationing server comprises an independent and separate apparatus from the client device; and
a hardware processor to implement the locationing server.

2. The system of claim 1, wherein the communications level comprises any one of: the communications being granted to a partial portion of the internal network; the communications being granted to a partial functionality of network resources.

3. The system of claim 1, wherein the locationing server is further to determine the communications level based on the physical location of the client device and condition the network access device to establish the communications level with the client device.

4. The system of claim 1, wherein the locationing server is to determine the physical location of the client device based on at least one of: the port of the network access device on which the client device is connected; the length of a physical communications line connecting the client device to the network access device; and a triangulation method using signal strength data from one or more access points surrounding any one of the client device and a wireless device wirelessly connected to the client device.

5. The system of claim 1, further comprising a security server to establish the communications as secured communications.

6. The system of claim 5, wherein the security server is to execute at least one of: a Wired Equivalency Privacy (WEP) authentication; a Message Authentication Code (MAC) authentication; and an IEEE 802.1X authentication.

7. The system of claim 1, wherein the network access device is to inspect received data packets to determine the destination addresses thereof and to forward the data packets to the destination addresses.

8. The system of claim 7, wherein the network access device comprises at least one of: a router; a hub; a switch comprising at least one of: a LAN switch; a WAN switch; an Ethernet switch.

9. The system of claim 1, wherein the client device comprises at least one of: a personal computer; a notebook computer; a computing device; a communications device; a wireless handset; a telephone; and a personal digital assistant.

10. The system of claim 1, wherein the communications comprises any one of: a wireline communications; and a wireless communications.

11. A method for authenticating a client device to an internal network, comprising:
  receiving a network access request message to the internal network from the client device;
  determining whether the client device is within an authorized physical location to communicate over the internal network;
  determining, by a hardware processor, a communications level of access to be granted to the client device in response to a determination that the client device is within the authorized physical location;
  performing a time-out function in response to a determination that the client device is outside of the authorized physical location;
  granting the determined communications level of access to the client device in response to a determination that the client device is within the authorized physical location prior to expiration of the time-out function; and
  denying, by the processor, access to the internal network by the client device in response to a determination that the client device is outside of the authorized physical location following expiration of the time-out function.

12. The method of claim 11, wherein the communications level of access comprises any one of: the communications access being granted to a partial portion of the internal network; the communications access being granted to a partial functionality of network resources.

13. The method of claim 11, wherein a state of network access of the client device is placed in a hold state pending a determination as to whether the client device is within the authorized physical location and a determination of the communications level of access.

14. The method of claim 11, wherein the communications level of access of the client device is based on the physical location of the client device being within one or more pre-designated facilities of an entity providing the internal network.

15. An apparatus comprising:
  a memory on which is stored machine readable instructions to,
    interface with a network access device to establish communications between a remote client device and an internal network, wherein the remote client device is to access the internal network through the network access device;
    determine whether the remote client device is within an authorized physical location to communicate over the internal network;
    determine a communications level for the communications between the remote client device and the internal network in response to a determination that the remote client device is within the authorized physical location;
    perform a time-out function in response to a determination that the client device is outside of the authorized physical location;
    grant the determined communications level of access to the client device in response to a determination that the client device is within the authorized physical location prior to expiration of the time-out function; and
    deny access to the internal network by the remote client device in response to a determination that the client device is outside of the authorized physical location following expiration of the time-out function; and
  a hardware processor to execute the machine readable instructions.

16. The apparatus according to claim 15, wherein the machine readable instructions are further to determine the communications level based on the physical location of the remote client device and a condition of the network access device to establish the communications level with the remote client device.

17. The apparatus according to claim 15, wherein the machine readable instructions are further to determine the physical location of the remote client device based on at least one of: the port of the network access device on which the remote client device is connected; the length of a physical communications line connecting the remote client device to the network access device; and a triangulation method using signal strength data from one or more access points surrounding any one of the remote client device and a wireless device wirelessly connected to the remote client device.

18. The apparatus according to claim 15, wherein the machine readable instructions are further to establish the communications as secured communications.

* * * * *